United States Patent
LeBeau et al.

(10) Patent No.: US 9,582,549 B2
(45) Date of Patent: Feb. 28, 2017

(54) COMPUTER APPLICATION DATA IN SEARCH RESULTS

(71) Applicant: Google Inc., Mountain View, CA (US)

(72) Inventors: Michael J. LeBeau, New York, NY (US); Prasenjit Phukan, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/686,516

(22) Filed: Apr. 14, 2015

(65) Prior Publication Data

US 2015/0227523 A1    Aug. 13, 2015

Related U.S. Application Data

(63) Continuation of application No. 12/789,147, filed on May 27, 2010, now abandoned.

(60) Provisional application No. 61/181,643, filed on May 27, 2009.

(51) Int. Cl.
*G06F 17/30* (2006.01)
*H04M 1/725* (2006.01)

(52) U.S. Cl.
CPC .... *G06F 17/3053* (2013.01); *G06F 17/30864* (2013.01); *H04M 1/72561* (2013.01)

(58) Field of Classification Search
CPC ......... G06F 17/30867; G06F 17/30864; G06F 17/30477; G06F 17/3053
See application file for complete search history.

(56) References Cited

U.S. PATENT DOCUMENTS

| | | | |
|---|---|---|---|
| 5,692,173 A | 11/1997 | Chew |
| 5,826,261 A | 10/1998 | Spencer |
| 5,983,220 A | 11/1999 | Schmitt |
| 6,370,527 B1 | 4/2002 | Singhal |

(Continued)

FOREIGN PATENT DOCUMENTS

| | | |
|---|---|---|
| EP | 1 557 773 | 7/2005 |
| KR | 2003/0080441 | 10/2003 |

(Continued)

OTHER PUBLICATIONS

International Search Report & Written Opinion for Application No. PCT/US2010/036454, dated Aug. 31, 2010, 14 pages.

(Continued)

*Primary Examiner* — James Trujillo
*Assistant Examiner* — Fatima Mina
(74) *Attorney, Agent, or Firm* — Fish & Richardson P.C.

(57) ABSTRACT

A computer-implemented search method includes receiving a registration request from each of one or more computer applications installed on a computing device and registering the applications in response to the request, wherein the registration request indicates an intent by the application to receive search query information from a search application associated with the device. The method also includes receiving user input on the device in the form of a query, providing the query to the one or more registered applications, receiving responses from the one or more registered applications that include data that is managed by the one or more registered applications; integrating the responses into a result set; and presenting the result set with the computing device.

23 Claims, 8 Drawing Sheets

(56) References Cited

U.S. PATENT DOCUMENTS

| | | | |
|---|---|---|---|
| 6,832,218 B1* | 12/2004 | Emens | G06F 17/30867 |
| 7,039,635 B1 | 5/2006 | Morgan et al. | |
| 7,376,907 B2 | 5/2008 | Santoro et al. | |
| 7,873,356 B2 | 1/2011 | Flynt et al. | |
| 8,086,604 B2 | 12/2011 | Arrouye et al. | |
| 8,661,029 B1* | 2/2014 | Kim | G06F 17/30867 707/723 |
| 2002/0169771 A1 | 11/2002 | Melmon et al. | |
| 2003/0033292 A1* | 2/2003 | Meisel | G06F 17/30864 |
| 2003/0041054 A1 | 2/2003 | Mao et al. | |
| 2003/0195877 A1 | 10/2003 | Ford et al. | |
| 2005/0065922 A1 | 3/2005 | Miller et al. | |
| 2005/0114306 A1 | 5/2005 | Shu et al. | |
| 2005/0165777 A1* | 7/2005 | Hurst-Hiller | G06F 17/30545 |
| 2005/0283468 A1 | 12/2005 | Kamvar et al. | |
| 2006/0004711 A1* | 1/2006 | Naam | G06F 17/30867 |
| 2006/0112179 A1 | 5/2006 | Baumeister et al. | |
| 2006/0206454 A1* | 9/2006 | Forstall | G06F 17/30864 |
| 2006/0271520 A1 | 11/2006 | Ragan | |
| 2007/0016570 A1 | 1/2007 | Punaganti et al. | |
| 2007/0067272 A1* | 3/2007 | Flynt | G06F 3/0482 |
| 2007/0143704 A1 | 6/2007 | Laird-McConnell | |
| 2007/0271229 A1* | 11/2007 | Ho | G06F 17/301 |
| 2008/0033954 A1 | 2/2008 | Brooks et al. | |
| 2008/0222131 A1* | 9/2008 | Wang | G06F 17/30867 |
| 2008/0275882 A1* | 11/2008 | Kehl | G06F 17/30696 |
| 2008/0320389 A1 | 12/2008 | Tanaka et al. | |
| 2009/0063448 A1 | 3/2009 | DePue et al. | |
| 2009/0204599 A1* | 8/2009 | Morris | G06F 17/30967 |
| 2009/0234815 A1 | 9/2009 | Boerries | |
| 2010/0125797 A1 | 5/2010 | Lavi et al. | |
| 2010/0131494 A1 | 5/2010 | Venolia | |
| 2010/0131517 A1* | 5/2010 | Huang | G06F 17/30864 707/752 |
| 2010/0131902 A1 | 5/2010 | Teran et al. | |
| 2010/0228724 A1 | 9/2010 | Petri et al. | |

FOREIGN PATENT DOCUMENTS

| | | |
|---|---|---|
| KR | 2008/0048786 | 6/2008 |
| WO | 98/12881 | 3/1998 |
| WO | 2006/113506 | 10/2006 |
| WO | 2007/115254 | 10/2007 |

OTHER PUBLICATIONS

Authorized Officer Y. Nakamura. International Preliminary Report on Patentability in international application No. PCT/US2010/036454, dated Dec. 8, 2011, 8 pages.

Kajmo, David and Susan Florio. "Domino R5: Domain Search." Mar. 1, 1999 [Retrieved on Oct. 16, 2012]; IBM. Retrieved from the Internet <URL: http://www.ibm.com/developerworks/lotus/library/ls-Domain_Search> (9 pages).

O'Brien, Mike. "The New Domino R5 Directory Catalog: an Administrator's Guide." The View, Nov./Dec. 1998 issue; Wellesley Information Services, Inc. (18 pages).

Chinese Office Action in Chinese Application No. 201080033110.8, issued Feb. 1, 2013, 14 pages.

Second Office Action in Chinese Application No. 201080033110.8, issued Oct. 15, 2013, 9 pages.

Office Action issued in Korean Application No. 10-2011-7031168 on Feb. 29, 2016, 14 pages. (with English translation).

Office Action issued in European Application No. 10726741.1 on Aug. 12, 2016, 11 pages.

Decision of Rejection issued in Korean Application No. 1020117031168, dated Nov. 30, 2016, 3 pages (English translation.

* cited by examiner ns that indicates a desire by the registered applica-
COMPUTER APPLICATION DATA IN SEARCH RESULTS

CROSS-REFERENCED TO RELATED APPLICATIONS

This application is a continuation of and claims priority to U.S. patent application Ser. No. 12/789,147, titled "Computer Application Data in Search Results," filed May 27, 2010, which claims the benefit under 35 U.S.C. §119(e) of U.S. patent application Ser. No. 61/181,643, titled "Computer Application Data in Search Results," filed May 27, 2009, which is incorporated herein by reference.

TECHNICAL FIELD

This document relates to systems and techniques for providing information in response to queries on a computing device, such as a smart phone.

BACKGROUND

The amount of electronic information available to us continues to grow and grow and grow. That information includes public information, such as information that is available on the World Wide Web and is frequently located using public search engines. The information also includes our own private information, such as contact and scheduling information on our portable electronic devices. As the information continues to grow, it gets harder to separate the wheat from the chaff and to present to a user the information in which they are most interested at the moment.

The manner of presenting information to a user is also a challenge. For example, some users are most interested in public content, while others may be interested in finding their own private information. Yet other users may be interested in finding information from different sources, or corpora, such as information about media files on their portable electronic device. The content of the information provided to a user when they are searching for information, the order in which it is presented to them, and the manner in which it is presented, can all contribute to the user's satisfaction with their device and with the services they use on their device.

SUMMARY

This document describes systems and techniques that may be employed to interact with a user of a computing device, like a mobile telephone that runs a search application. In general, the techniques may permit a search application to return search results—such as in the form of actual results or as suggestions for search queries the user may want to submit—from a number of different corpora, including corpora that are managed by third-party applications on the device. A third-party application is an application that is not part of the operating system for the device, and generally involves applications that are added to the device by the user after they have purchased the device. For example, a contacts manager that is integrated with the operating system on a smart phone would not be a third-party application, while a media player that is provided by a company that differs from the company that provided the operating system, would be a third-party application.

Using the techniques discussed here, the third-party applications may have their information integrated with other results provided by the search application by registering themselves with the search application. Then, when a partial or complete query is entered by the user into the search application, the search application may send the query to all registered applications, and may receive results back from those registered applications. The search application can also search core applications that are part of the operating system, such as a contacts database or a list of applications that are loaded on the device. In addition, the search application may, in appropriate circumstances, send the query to search services that are remote from the device, such as standard public search engines, and may receive results in the form of search suggestions or a list of final search results, from such services. The search application may then aggregate all the various responses and display them to a user of the device.

The manner in which the results are sorted for presentation to the user may be arranged so as to reflect likely interests of the user. For example, results that are intrinsic to the operating system may, at least at first, be provided with priority (i.e., displayed first in a group of results) under the assumption that a user will be most interested in items that were important and central enough that they were incorporated into the operating system. Web results may also be provided a relatively high priority. Results from third-party applications may initially be given a lower priority, and may be placed initially on a second page of search results. However, if a user selects a result for a particular third-party application, then the results for that application may be "promoted" to the first page, and subsequent selections by the user of such results may cause the results to move even higher in the list of results that are shown by the search application.

In certain implementations, such systems and techniques may provide one or more advantages. For example, a user may be provided with an integrated presentation of search results that span across multiple corpuses from multiple different locations, including on the user's personal computing device. Also, the ranking and presentation of results can correspond to preferences of the user that are inferred from the user's actions, such as the user's responses to prior presentations of results. Also, the techniques discussed here can permit third-party application developers to have their data included in a global search result, in a manner of their choosing, so that they can maximize the usefulness of the results to a user of a computing device. For each of these reasons, the user experience for a user of a computing device can be improved, so that the use employs the search service more frequently, and has a positive impression of their device and its software (which may lead to follow-up purchases by the user, or word-of-mouth advertising from the user to potential buyers of the device of software).

In one implementation, a computer-implemented search method is disclosed. The method comprises receiving a registration request from each of one or more computer applications installed on a computing device and registering the applications in response to the request, wherein the registration request indicates an intent by the application to receive search query information from a search application associated with the device. The method also comprises receiving user input on the device in the form of a query, providing the query to the one or more registered applications, receiving responses from the one or more registered applications that include data that is managed by the one or more registered applications, integrating the responses into a result set, and presenting the result set with the computing device. The registering of the applications can comprise storing registration information for the registered applications, and providing the query to the one or more registered applications comprises accessing the registration information to determine a mechanism for providing the query to each of the registered applications. Also, the query can comprise characters entered by a user without entering a query submission command.

In some aspects, providing the query to the one or more registered applications comprises providing an updated query automatically to the registered applications for each character entered by the user of the computing device. The method can also comprise providing the query to one or more search services that are remote from the computing device. In addition, the method can include suppressing the providing of the query to the one or more search services until the user has entered a determined amount of information in the query. The determined amount of information can include a predetermined number of characters in the query.

In certain aspects, integrating the responses into a result set comprises integrating responses from the registered applications with responses from one or more operating system components on the computing device and responses from one or more remote search services. Also, integrating the responses into a result set can comprise ranking the responses with respect to whether each response was generated form an operating system component, from a registered application, or a remote search service. Alternative, integrating the responses into a result set can comprise ranking the responses with respect to whether the user of the device has previously selected results provided by a particular registered application.

In another implementation, a computer-implemented search method is described that includes receiving user input on a computing device in the form of a query, and providing the query to a plurality of different search result resources that include one or more applications on the computing device and one or more search services remote from the computing device. The process also include receiving a plurality of responses from the plurality of different search result resources and integrating the plurality of responses with others of the plurality of responses and placing the responses in a ranked order, and displaying the plurality of results on the computing device. Placing the responses in a ranked order in this implementation comprises assigning an initial score to results from a particular search result resource, and modifying the score positively if a user selects a result from the particular search result resource.

In some aspects, placing the responses in a ranked order comprises assigning an initial score to responses from applications installed on the device so that the responses do not appear on an initial search results display, but are elevated to an initial search results display once a response from a particular application is selected by the user. The method can also include suppressing the providing of the query to one or more search services remote from the computing device until a threshold level of information has been entered in the query, while providing the query to the applications on the computing device. In addition, the method can include receiving registration requests form the one or more applications on the device, and registering the applications by storing registration information for the applications, and wherein providing the query to the one or more applications comprises accessing the registration information to determine a mechanism for providing the query to each of the applications. Moreover, providing the query to a plurality of search result resources can comprise providing an updated query automatically to the registered applications for each character entered by the user of the computing device.

In yet another implementation, a computer-implemented search system includes memory storing registration information stored on a computing device, the registration information identifying manners for providing search query information entered by a user of the computing device, and one or more third-party applications on the device corresponding to the registration information and defining interfaces for receiving the search query information and for providing corresponding search results generated by the third-party applications. The system also includes a search application having code to use the registration information to route search query information to the third-party applications, to integrate the search results into a result set, and to present the result set to the user with the computing device. The system can additionally include one or more of search systems located remote from the computing device, wherein the search application includes code to provide the search query information to the search systems, and to integrate results from the search systems with results from the applications. The system can additionally include a result ranker to produce a ranked order of the integrated results, and the result ranker can access information indicating the user's responses to prior results corresponding to the one or more third-party applications.

In another implementation, a system includes memory storing registration information and one or more third-party application as in the implementation above. The system also includes a means for generating an integrated ranked list search results form the one or more third-party applications.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which a search application on a computing device can integrate and deliver results from various different sources. The sources can include applications that are native to the operating system on the device, third-party applications that have been loaded on the device, and remote servers that serve search results in response to the submission of search queries. The particular results can include suggestions, which may be terms that begin with the characters a user has already entered, and whose selection will cause the terms to be submitted to a search engine for the delivery of information that can lead to records or documents such as web pages, or final search results, which themselves point to the final records or documents. Also, a mix of results in the form of suggestions and final search results may be provided. Such provision of results may occur while a user is entering a query (e.g., between individual character entries by the user on a keyboard), and also after the user has submitted a completed query.

The results may be sorted by inferring what categories of information the user is most interested in. As an initial matter, it can be assumed that the user is most interested in information associated with applications that are central to their device, such as personal information manager applications like scheduling and contacts applications. The user may also be interested in seeing the names of applications that have been loaded onto their device, as a mechanism for launching such applications (e.g., if the user has not chosen to add an icon for a particular application to their desktop). In addition, it can be assumed that a user will be interested in web search results (which make up the vast majority of on-line search requests). The user might also want to search in data stored and managed by various applications that they have loaded on their device, though it may be difficult for a search application to determine, initially, how interested the user would be. As a result, a search application may initially treat such information as having a low interest, and then promote such information in rankings of subsequent search results as a user interacts with results directed to that particular application, or as the user interacts with data in the application.

Figure 1:
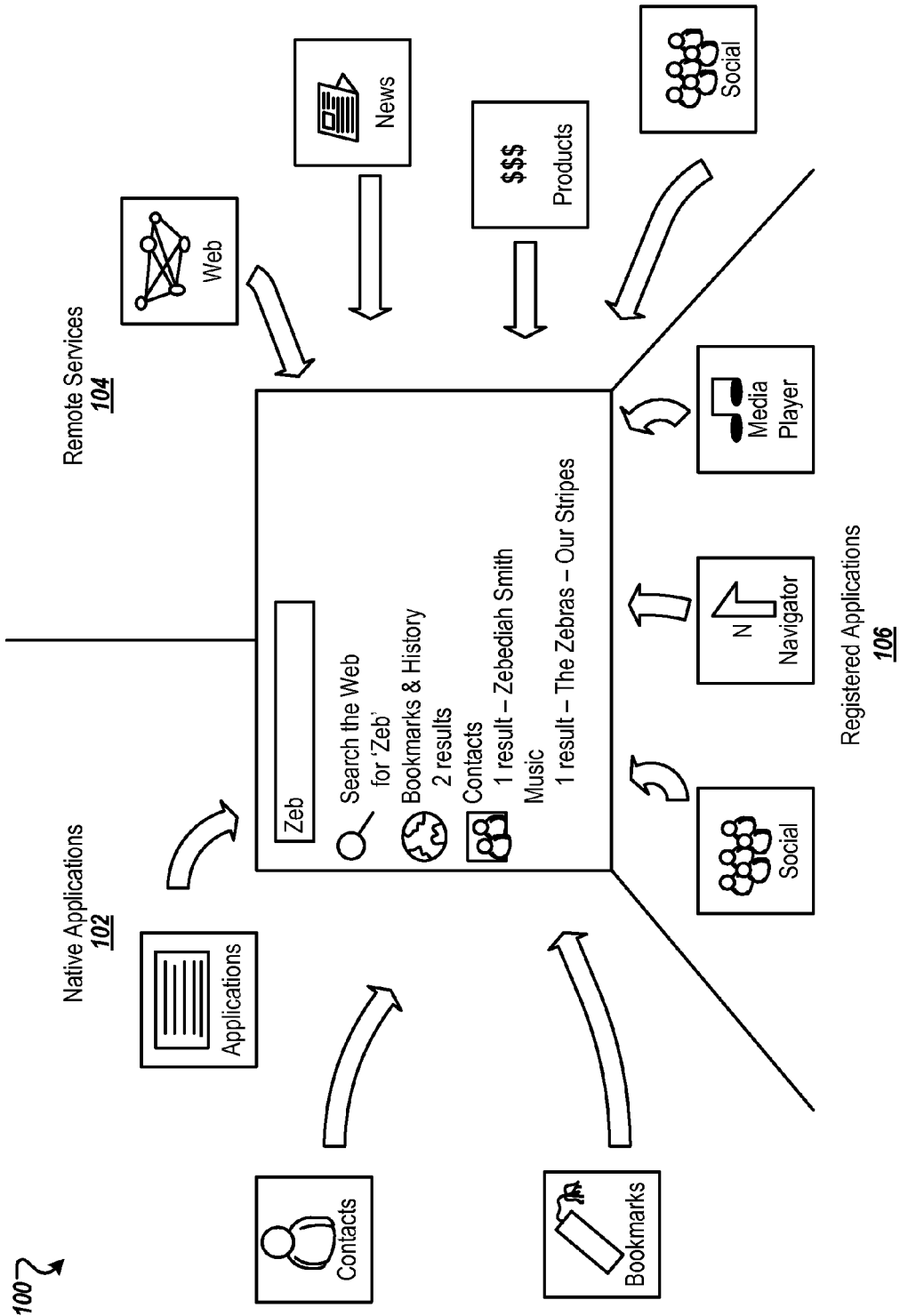
FIG. 1 is a conceptual diagram that shows a search application on a computing device that receives search results from a variety of different sources.

FIG. 1 is a conceptual diagram that shows a search application 100 on a computing device that receives search results from a variety of different sources. The search application 100 appears at the middle of the figure, surrounded by icons that represent each of a plurality of corpuses or sources of information that can be accessed via the search application 100. In general, the arrangement shows how numerous different sources of information can provide content for a search, and how the search application 100 can rank and present parts of that content.

For purposes of this example, the content sources are shown as falling into one of three groups. First, there are the native applications 102. These are applications (and corresponding data sources) that are provided with a device initially and with the search application that also comes with the device. Frequently, native applications for mobile devices take the form of personal information management applications, such as address or contact books, task lists, and appointment books or calendars. The applications may also include a web browser, where the native application data may include a history list or bookmarks—and where a user may want to use the search application 100 to quickly find a link to one of their favorite web pages (e.g., when they don't want to have to manually launch the browser and then select the bookmark or type the URL). In addition, the native application data may include identifies of applications themselves, so that the search result includes a title of an application overlying a link whose selection causes an instance of the application to launch.

Remote services 104 are also shown, and can take a wide variety of well-known forms. The most common type of remote service is a typical web search engine that provides a list or other organization of objects that a user may select to be taken to web pages (i.e., landing pages) or other documents that are responsive to a query submitted by the user. The remote services can also provide recent news stories as search results; lists of products that a user might be able to buy, prices for the products, and links to sellers of the products; and social networking information such as data from pages of friends of a device user.

In addition, one or more remote services may provide suggestions as results to a partial user query. Suggestions are terms that a service infers the user might be trying to enter while the user is still entering a query. Suggestions are presented before the user submits a final search result (e.g., by pressing an enter key or clicking a submit button), and are educated guesses at the final query that the user is in the process of entering. Generally, the suggestions are selected from a group of all terms that begin with the characters the user has entered so far, sorted by a metric such as the frequency with which such terms have appeared in past searches provided by a plurality of users to the search service. In some situations, selection of a suggestion causes a search to be performed that uses the selected suggestion as the query term, and that returns a plurality of search results. In other situations, the suggestion is the result itself, and selection of the suggestion brings up the target document for the result. For example, a search application may return actual contact information for particular contacts while a user is typing a query, so that selection of a displayed name for a contact will result in that person's telephone number being dialed automatically, or in a complete contact record for that person being displayed.

Certain operations by a user may also occur across corpora, such as where a contact's name comes up in the middle of a user's entering of a query, and the user selects the contact name for a web search. The name may then be submitted to a web search service and web search results may be returned, rather than opening a contact record for that person.

The third group of search data comes from third-party applications. The applications can take a near infinite variety of forms, and may address a near infinite number of topics. In this example, three such applications are shown for purposes of illustration. First, a social application may store information (either locally on the device or remotely at a hosted service) about a user's social network, such as names of friends and the like. The social application may be used in place of or in combination with the social service shown in the remote service 104. For example, certain limited information, such as names and URL's for friends, may be stored locally on a device and synchronized with the social service, and more detailed information such as content on friends' pages, can be stored centrally and provided via the social service. Second, a navigator application can provide maps to a user and keep track of locations visited by the user. The navigator data may include, for example, names of locations (e.g., Camden Yards, Shea Stadium, etc.) and may be returned as search results that a user may select to be shown a map of the area associated with a selected name. Third, a media player is shown, and its data may include the names of media files (e.g., titles of songs or movies), the names of artists (e.g., singers, groups, actors, or directors), playlists, and the like, where a user selection can cause a folder showing songs from a particular artiest, or can cause a particular media file to begin playing.

An example display for the search application 100 is shown at the middle of the figure. In this example, the user is in the process of entering a query that begins with the characters "zeb." Each time the user enters a character, the then-current search string can be submitted to the various relevant search sources, and results from those sources can be displayed in an area around the search box where the user is typing as quickly as is practical.

Example results that have been gathered from the various pictured sources are shown on the display for the search application in the middle of the figure. The results are shown generally in the form of a suggestions box that may pop up temporarily below a search entry box that is generated by the search application 100. In this example, the results have been sorted by the search application 100 in a particular order. The first result is a search suggestion that, if selected by the user, will cause the device to perform a web search for the term that has been entered so far. Such an item could also provide a suggestion of a more complete term that includes the letters that have been entered so far (e.g., zebra).

The second entry in the list indicates that two bookmarks or histories have been located that begin with the characters "zeb." Such a result comes from data local to the machine, and in particular, a web browser. The web browser that supplied the information may be integrated with the operating system so that the operating system is specifically programmed so that the pictured information gets to the search application 100. In a similar manner, the third entry shows a single contact that is responsive to the search, and because a single contact can be displayed in a minimum of screen space, the actual name of the contact may be shown in a manner so that the user of the device can select the contact without any further selections. A threshold may be set on a device to control the number of records that could be shown in such a display before the display will collapse into a single-line summary display like that shown for the bookmarks and history result.

The fourth result is from a third-party application on the device—i.e., the media player shown in the zone of registered applications 106. Such an application may register itself with the operating system on the device so that when any search characters are received by the search application 100, the search application understands to forward those characters to a location identified by the third-party application. In this example, the music player received the query string of "zeb" and found a single item that was responsive to such a request—the song "Our Stripes" by "The Zebras."

The particular order of the results on the search application 100 can depend on assumptions about corpuses that will most interest a user, in addition to data reflecting a user's prior responses to results from such corpuses. For example, web search is at the top here, and may have been assigned such a position by the search application under an assumption that users who employ a search box generally want to conduct at least a search of web properties. The next two results appear in their positions under a presumption that a user of a device has a core interest in material they have placed on the device. Finally, the music result reflects an assumption that the information from a third-party application—absent a user action to the contrary—will be of lesser relevance to a user. The music result may climb, and may already have climbed, based on a user's selection of music results that were displayed in response to prior search queries on the user's device—such selections indicating that, not only did the user want a music-playing application on their device, but they actually want to, and do, use the search application 100 to find that information.

In certain implementations, as described in more detail below, submission of a partial query may be suppressed to certain corpora in certain situations. For example, characters may not be submitted to the remote services 104 until a certain number of characters have been entered, such as 3 or 4 characters. In this manner, results local to the user's device may have initial prominence and the user may select them if that is what the user is looking for. Also, the number of members in the local corpora for a single character is relatively small (tens or hundreds) compared to the number of members for remote services such as web search (millions or billions). As a result, local corpora are more likely to provide useful results for such single-character or two-character entries than would the remote services (which would largely be guessing in the dark if they were asked to provide a response to the query "z"). The remote service results can then be blended in, and may take prominence, after the triggering number of characters have been entered. Alternatively, the remote services may be consulted, but display of their results may be suppressed until the number of hits falls below a threshold number that represents that the results are relatively accurate, or until an accuracy score from the remote service hits a particular level. For example, a device may submit a query, but the service may be programmed not to respond unless its confidence in its results is sufficient, and the device may simply not display results from the service in that case.

Figure 2:
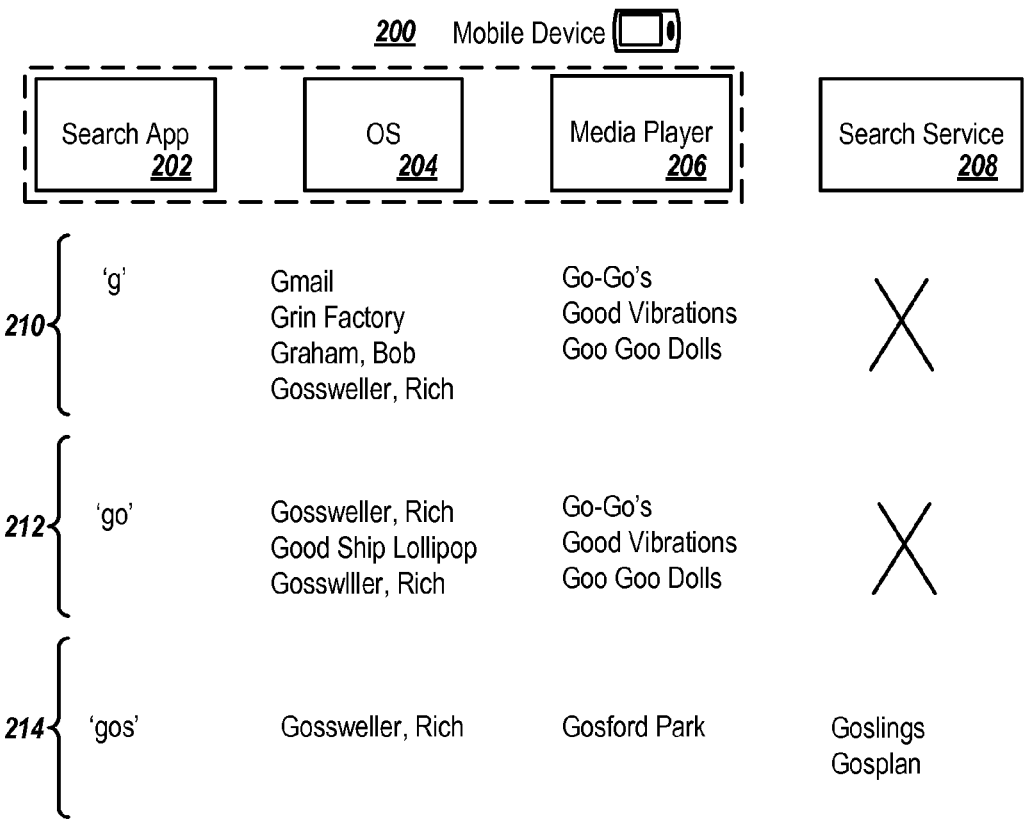
FIG. 2 shows an example search session by a user of a mobile computing device and corresponding search results from a variety of sources.
Figure 2:
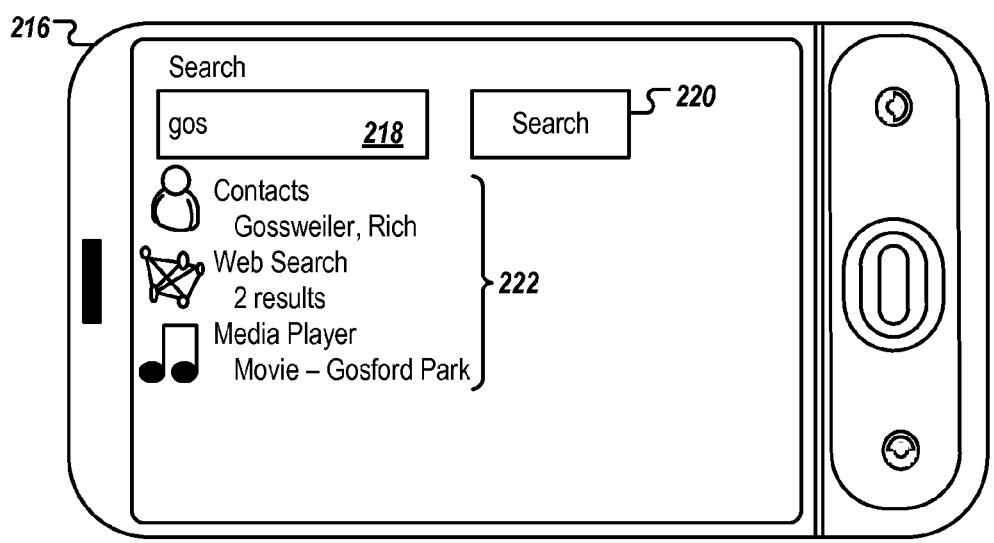

FIG. 2 shows an example search session by a user of a mobile computing device and corresponding search results from a variety of sources. In general, what is shown is the characters entered by a user of a device 200 and the responses made by applications that manage certain corpuses of information that might be of interest to a user of the device 200.

The relevant components that play a role in the user's search session are shown across the top of the figure. First, a search application 202 receives queries from the user and distributes the queries to the other illustrated components. Second, an operating system 204 represents core applications that may be part of the device operating system itself such as a contacts manager. Third, a media player 206 represents an application that may not be integrated with the operating system, but that was instead purchased by the user of the device 200 from a third party, and installed on the device 202 after the purchase and set-up of the device 200. Each of these three components are enveloped by a dotted line that represents the device 200, and thus represents that each such component involves search that is local to the device, rather than search that is handled by a remote service such as a commercial search engine.

Box 208 shows such a commercial search service. The service can take many forms, and in a typical form would provide web search results in response to the submission of queries formed from alphanumeric characters.

A first character entered by the user is shown at step 210. The letter is "g", and triggers two different types of responses by various operating system components. First, the names of two applications—Gmail and Grin Factory—are returned by the operating system components. Second, the names of two of the user's contacts are shown. Such results may be passed back to the search application 202 as quickly as possible so that they can be displayed to the user while the user is still typing.

The media player 206 has generated two types of results—a song title and two band names. Though shown alone in this example, the results could also include additional metadata such as labels "song" and "group" or "artist". In addition, the media player 206 would be expected to return to the search application 202 information needed to generate a hyperlink so that a user of the device 200 can quickly select the song title to listen to that particular song, or can select one of the band names to see a complete list of songs by that band that are stored on the device 200 or are available for steaming via the media player 206.

For its part, the search service 208 has generated no results for the letter "g". This is not because there are no results—rather, it is because there would likely be too many results for the results to be meaningful to the user of device 202. As a result, the results are suppressed for the first two characters of a query that a user enters. Such suppression may occur by the search application 202 failing to send query information to the search service 208 until a predetermined number of characters appear in the search field, or can also occur by the search service 208 receiving a query but refusing to provide a response, such as where a quality score of all the responses falls below a predetermined threshold level.

The second character is shown at step 212, where the characters "go" have been entered. The operating system 204 components have responded by eliminating three of the prior results that are no longer responsive, showing one of the prior responses twice (perhaps by error or perhaps because that persona appears as a contact and a meeting reminder), and by adding a new matching result. That result may have matched before, but was ranked low enough that it was not returned by the relevant operating system component. With respect to this aspect of the process shown here, it may be in the best interest of an application to not return all matching results, and the particular application may make such a determination to limit the matches that it returns. In particular, a user may be unsatisfied with the performance of an application if it returns results that have marginal relevance, even if they are technically matches. Also, the search application 202 or an API by which the applications communicate with the search application may impose limits on the number of results that may be returned to the search application 202.

The third character is shown at step 214, where the characters "gos" have been entered by a user. The operating system components 204 have now narrowed to a result that is a single contact. The media player 206 has eliminated all of its prior results, and located a movie—Gosford Park—that was not previously shown, perhaps because it had received a very low rating from the user or from an on-line rating source, or perhaps because it had not been accessed on the device 200 for a very long time. Also, the search service 208 has finally been brought into the process, and has provided two results in the form of suggestions—one for a young bird, and another for a Soviet economic planning committee. These results may have been returned as suggestions, either because they were the only matches in the corpus that the search service 208 was analyzing or because there had been extensive recent interest in the topics, as judged by a number of search queries containing the terms that were received by the search service 208.

Device 216 shows the manner in which the search application may integrate and display the various results that are received at step 214. First, the device 216 shows a search box 218 in a standard form, with the characters "gos" having been entered into the box 218. A search button 220 is also shown, but has not been selected to indicate a user intent to submit a complete search query, so that some of the results 222 are in the form of suggestions for completing the user's partially-completed query. The contact is shown first, indicating that heuristic rules programmed into the search application 202, when combined with usage data for a contact (e.g., a number of times or percentage of times or other frequency with which the user has selected contacts when they are presented in a result set), indicate that the user is likely to be most interested in the contact. The fact that the contact corpus generated only one result may also play a role in its rank in the results 222 being elevated relative to other results. The second result is the two web search results returned by the search service. Because there are multiple results in this corpus, the actual identity of either result is not shown, and instead, a summary is shown to indicate that there are two suggestions for web searches. If the user selects (or hovers over) this area in the results 222, they will be shown the two results, and if they select one of the results, a search will be performed on the term of that particular selected result. The third result is the movie from the media player 206. As indicated before, the media player had ranked the movie pretty low relative to other results, and it is again ranked low in the list of global results across the multiple corpuses. That low ranking may be based on the heuristic rules or usage information discussed above, or may also be based on a score that the media player passed to the search application 202. However, mechanisms may be required where the search application 202 is relying on scoring from third-party applications so as to prevent any cheating by applications that attempt to push their results higher improperly. Also, the display shows that the movie is tagged as a movie in the result set, so that the media player 206 must have passed that piece of meta data along with the movie title. The movie title may also be in the form of a hyperlink that points to the media file for the movie on the device 216 or on a remote server (e.g., for streaming applications) so that a user's selection of the title causes the movie to start playing, or detailed information about the movie to be shown (e.g., a list of stars, a summary, reviews, and the like).

Figure 3:
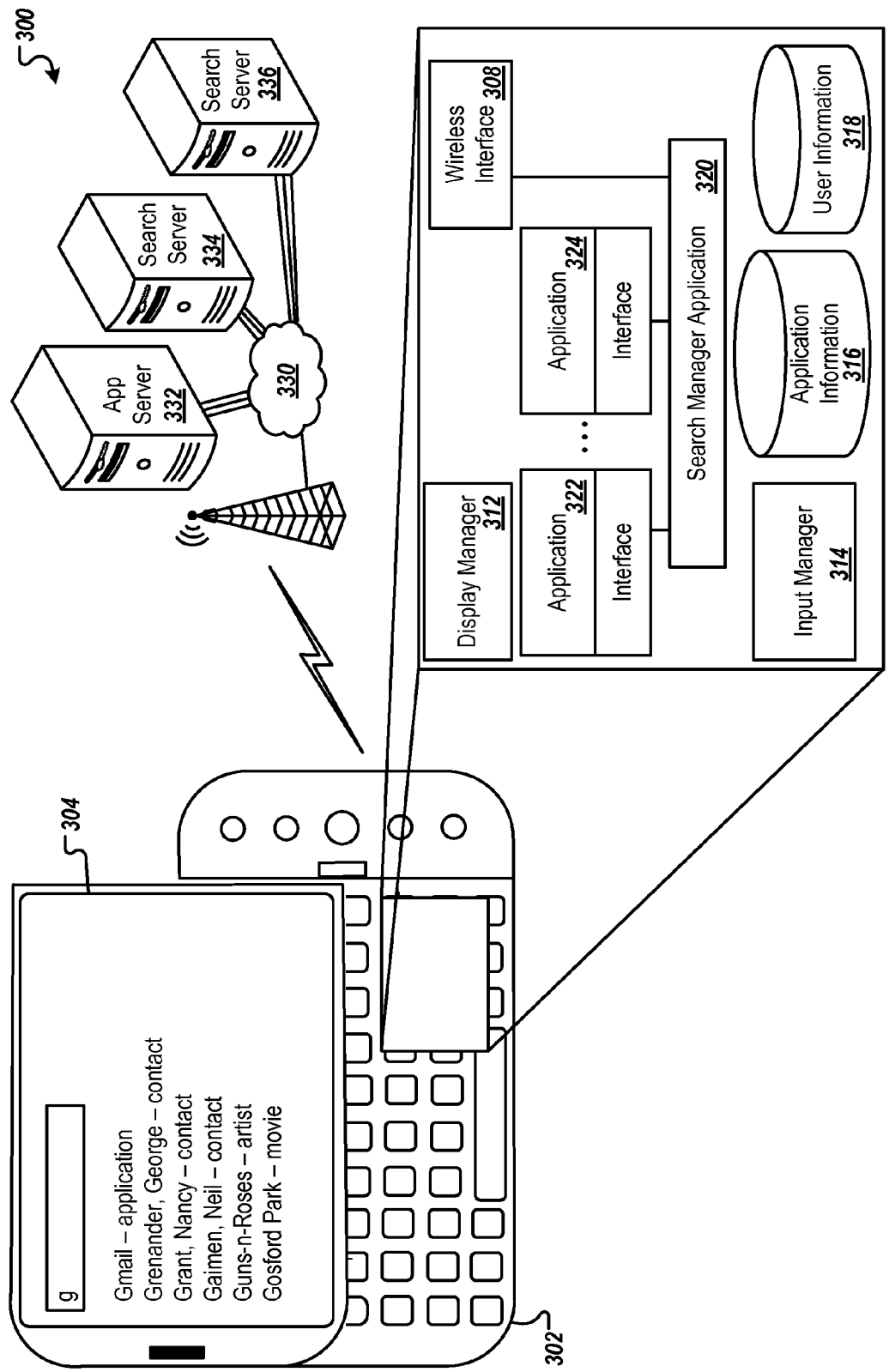
FIG. 3 is a schematic diagram of a system that provides search results from third-party applications and other corpuses of data.

FIG. 3 is a schematic diagram of a system 300 that provides search results from third-party applications and other corpuses of data. The system 300 may be implemented using a mobile device such as device 302. The device 302 includes various input and output mechanisms such as a touch screen display 304 and a keyboard. A number of components within device 302 may be configured to provide various search and presentation functionality on display 304, such as gathering, integrating, and presenting search results from multiple different sources and corpuses.

One such component is a display manager 312, which may be responsible for rendering content for presentation on display 304. The display manager 312 may receive graphic-related content from a number of sources and may determine how the content is to be provided to a user. For example, a number of different windows for various applications 310 on the device 304 may need to be displayed, and the display manager 312 may determine which to display, which to hide, and what to display or hide when there is overlap between various graphical objects.

An input manager 314 may be responsible for translating commands provided by a user of device 302. For example, such commands may come from a keyboard, from touch screen display 304, or from other such sources, including dedicated buttons, trackballs, or soft buttons (e.g., buttons whose functions may change over time, and whose functions may be displayed on areas of display 304 that are adjacent to the particular buttons). The input may also occur more inferentially, such as from signals provided by an on-board compass or accelerometer. The input manager 314 may determine, for example, in what area of the display commands are being received, and thus in what application being shown on the display the commands are intended for. In addition, the input manager 314 may interpret input motions on the touch screen 304 into a common format and pass those interpreted motions (e.g., short press, long press, flicks, and straight-line drags) to the appropriate application. The input manager 314 may also report such inputs to an event manager (not shown) that in turn reports them to the appropriate modules or applications.

A variety of applications may operate, generally on a common microprocessor, on the device 302. One such application, which may be bundled with the device when it is sold or added to the device later, is search manager application 320. The search manager application 320 is responsible for placing a search box on the screen 304 or otherwise providing a mechanism through which a user can enter queries. The search manager application 320 is also responsible for taking the queries and sending them via multiple threads, to various other applications, such as applications 322, 324 on the device 304, and to remote systems. Furthermore, the search manager application 320 is responsible for receiving results back from those objects, and for compiling the results into a ranked list of search results that span across multiple corpuses, such as in the manners discussed above and below. The search manager application 320 and other applications on the device 304 may depend on various forms of data stored on the device 304. First, user information 318 may stored information that reflects preferences of a user of the device 304. Such preferences may be identified explicitly by the user, such as in a user profile that defines how the user wants the display 304 to look, or how the user wants other parameters of the device 302 to behave. The preferences may also be implicit, such as data indicating the sorts of search results the user typically selects or the applications the user launches frequently. Such information can be used to affect the rank of a search result in a combined search result set created by the search manager application 320.

Various applications can also access application information 316. Such information may take a variety of forms, and may include actual data that is central to the application, such as documents for business productivity programs, media files for a media player, or other similar files. The information 316 may also include meta data, such as rankings that the user has given to a particular piece of media, or the number of times the user has played it. Again, such information may be used to infer the user's interest in a corpus of data associated with a group of search results, and may cause results that correspond to that corpus to be elevated or lowered in a search result grouping.

The various applications 322, 324 are applications that have registered themselves with the search manager application 320, so that the search manager application 320 knows to send them queries when queries are entered into the search manager application 320. The registration information can include an address or other mechanism for telling the search manager application 320 where to send the information so that the relevant application will be notified and can begin to process a response as quickly as possible. Other applications on the device that are not shown in this figure, have not registered themselves as applications that would like to be made part of the search process.

A wireless interface 308 may also receive communications from search manager application 320, so as to pass such information (e.g., queries) to remote services, such as services running on application server 332, and search servers 334 and 336. Such communications may occur over one or more networks, include a LAN, a WAN, and the internet 330, in addition to a wireless network with which the device 302 is subscribed.

The application server 332 may be associated with one of applications 322 and 324, and may be accessed by the applications 322 and 324 to obtain data or supplemental data in responding to a query. For example, a media player program on a device 302 may be able to return a song title and limited other information as a search result, but the application may be provided with the ability to deliver additional functionality by additionally searching lyrics that are stored and indexed on application server 332. As a result, such an application would not be limited to responding to queries simply for sing titles and artists, and would also not be limited to delivering results merely in the form of titles and other limited data. The applications 322 and 324 can also access the application server 332 outside the context of the searching described here. For example, a media player application could access lyric information while playing any media file so that a user of device 302 can see the lyrics as they are sung/played.

The search servers may be accessed directly by the search manager application 320 in manners like those discussed above. Two search servers 336 are shown here to represent two different corpuses (e.g., web and image) that can be searched simultaneously, though multiple corpuses may be searched and delivered through a single gateway. As noted above also, the search servers 334 may be suspended from delivering results through the search manager application 320 until after a user has entered a sufficient amount of information to make the results from the search servers 334, 336 reasonably useful.

In this manner, the various components of system 300 can provide a superior search experience for a user of device 302. In particular, the user can be provided results form multiple corpora and multiple applications in a single result set. The result set may also be ordered according to interactions that the user has had with results form particular corpora in prior search result sets, e.g., so that frequent user selections from a particular corpus will cause other results from that corpus to be ranked higher in future result sets.

Figure 4A:
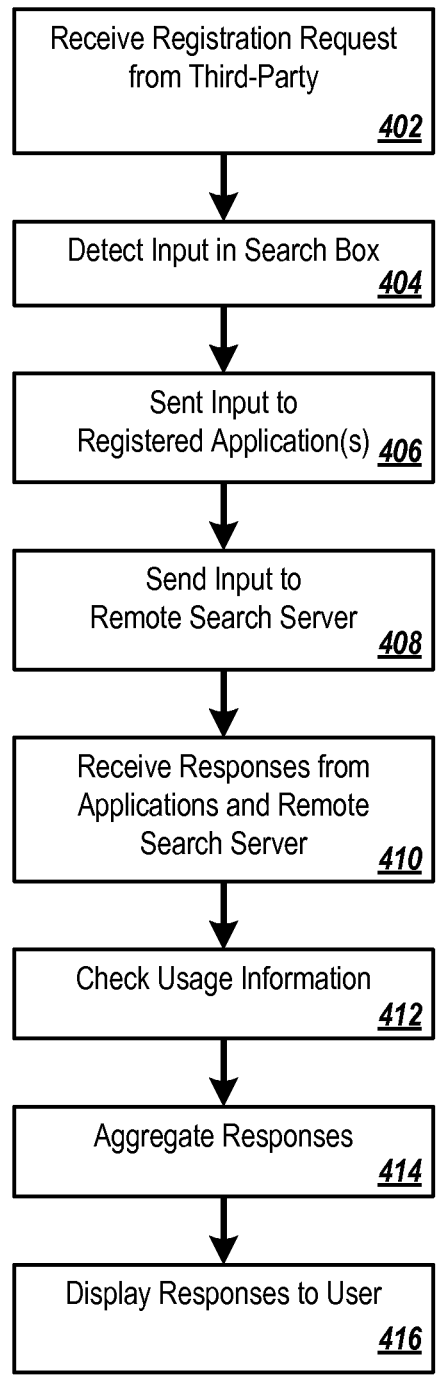
FIG. 4A is a flow chart of an example process for providing search results from a plurality of data sources.

FIG. 4A is a flow chart of an example process for providing search results from a plurality of data sources. In general, the process involves the registration of third-party applications with a search service provided on a computing device, subsequent spreading of search queries to registered applications and other search sources, and integrating of search results from the various services.

The process begins at box 402, where the search service receives a registration request from each of one or more third-party applications that have been loaded on the device. The request may be made according to a published API for the search service, and the applications may each submit information sufficient for the search service to send search query information to the registering applications. The search service may also check an external source to determine whether the third-party application is sufficiently trusted or legitimate to be allowed access to putting search results into a result set for the search service.

At box 404, the search service detects input in a search box. Such detection may occur by a user making a search application active, or simply by a user entering text into a search box that may be persistently displayed as part of a user interface (e.g., in a toolbar or system tray or similar structure). The detection may occur for every character that a user enters, so that search results are returned for every keystroke from the user. Such an approach may allow the user to save time and keystrokes, as it may present to the user the search term that the user has begun entering (e.g., as a suggestion) or may present search results before a user has finished entering a query.

At box 406, the search service sends the entered characters to the registered applications. Such submission may be repeated for every character that is entered (including characters that delete a previously-entered character). The query characters may also be submitted to more traditional sources other than registered third-party applications, such as operating system components on the user's computing device and remote search systems that are far from the computing device, and accessed over the internet (box 408).

The service can then receive responses from the various applications or services to which it sent the query information and can begin integrating the received information into a single global result set. The integration can occur in a batch or serially. For batch integration, the process may wait until all of the applications or services have responded, or a timeout period has expired, and may then present the result set to the user (after ordering it in a ranked order). For serial integration, the results can be shown to the user as they arrive back from the various services or applications. The newly arriving results can be slotted into position in the result set as the user watches the result set change and evolve. Thus, results that are local to the device may be returned first, while results form remote servers may be returned last. Where latency is minimal, the difference in timing may be imperceptible to the user.

In determining how and if to display a particular result, the process may check usage information for particular results in prior search result sets (box 412). For example, results for a new third-party application may initially be kept on a second screen of results until a user selects a result from the application one or more times. Such user selection may provide an implicit suggestion that the user likes seeing results from that application or corpus, so that future results form the application or corpus may receive a higher ranking and may be displayed on a first page in the result set.

At box 414, the responses are aggregated for display to the user. As noted above, the aggregation may occur as a batch or serially. Also, the order of the results may take into account a number of signals in addition to a user's interaction with prior results. For example, the process may obtain data regarding other users' interactions with results for particular applications so that results shown to the present user may be properly tuned (at least according to the preferences of the group) even before the particular user has expressed a preference. Also, certain types of applications or certain types of data may be biased toward a particular weighting, with the understanding that, even if a user does select results from that area for a period, the user is still unlikely to want to see such results high on their list for a long time period.

Finally, at box 416, the results are displayed. Again, the display need not occur after all results have been returned and ranked, and the particular manner in which the results are displayed in a graphical user interface may vary depending on the situation.

Figure 4B:
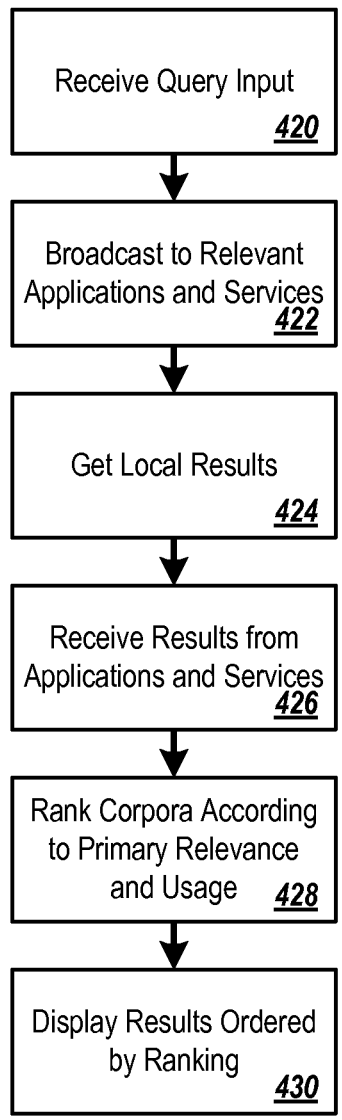
FIG. 4B is a flow chart of an example process for providing search results from a plurality of data sources in a particular ranked order.

FIG. 4B is a flow chart of an example process for providing search results from a plurality of data sources in a particular ranked order. This process is generally similar to the process shown in FIG. 4A but provides additional detail regarding the ranking of search results on a computing device.

The process starts at box 420, where query input is received from a search box or other component. (Applications have presumably already registered themselves with the system, where such registration is needed to perform global searching across multiple corpora.) At box 422, the query is broadcast to relevant applications and services, in manners similar to those discussed above. At box 424, local results are returned to the process, such as results from operating system components and from third-party applications that are running on the computing device. Such results will generally (though not always) arrive first because they do not have a long round-trip path. Then, at box 426, results from applications and services arrive. These later results may be from third-party applications that needed to acquire data from a remote service (e.g., in the music lyric example above), and the services would be services hosted by remote server systems.

At box 428, the corpora from which results were returned are ranked. Such ranking may occur by a number of signals, including primary relevance and usage data. Primary relevance indicates how important the particular corpora is presumed to be to the user in the context of search results. Such a determination may be made without regard to particular actions by the particular user, such as by determining that particular corpora are more relevant than other corpora. The determination may also take into account characteristics of the particular user, such as age (e.g., college-age users may presumably prefer to have music selections shown high in a search result).

The usage data involves analysis of the ways in which the particular users or other users in aggregate have reacted to particular data. For example, if the particular user frequently selects songs when searching, the grouping of results from the user's media player application may be elevated in a result set. Similarly, if all users of a device, all users in the particular user's social network or demographic group, or another relevant group of users, frequently make such a selection, the selected corpus may be elevated in the result rankings. The ranking of a corpus may also depend on the perceived quality of the search results that are being returned by the search process. For example, if a particular corpus generates results that are perceived by the ranking algorithm to be direct hits, the entire corpus may be elevated in the search rankings.

Finally, at box 430, the results are displayed to the user according to the determined rankings.

Figure 5:
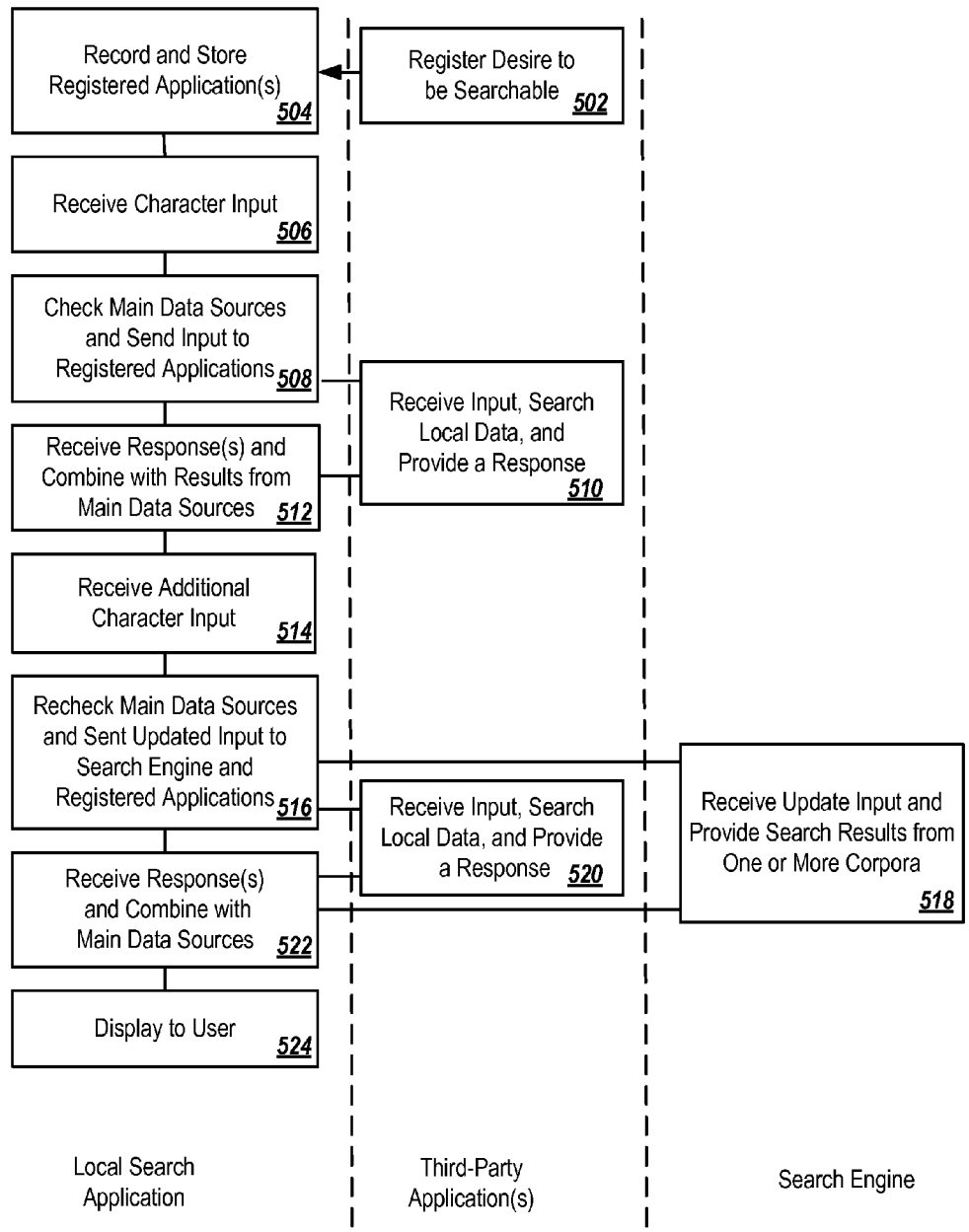
FIG. 5 is a swim lane diagram that shows a process for delivering search results for multiple corpora.

FIG. 5 is a swim lane diagram that shows a process for delivering search results for multiple corpora. In general, this process is similar to the processes shown in FIGS. 4A and 4B, but shows in more detail the roles played by particular components in the search system.

The process begins at box 502 where one or more third-party applications register themselves with a local search application, and the local search application records and stores information regarding the registered applications. The local search application may also check the bona fides of the requesting applications to ensure that they are not nefarious.

At box 506, the local search application receives character input from a user of the application, and at box 508, the local search application checks the main data sources to which it has direct access (e.g., contacts, application names, and similar data) and sends the input characters to the registered applications. At box 510, each relevant registered application receives the entered characters and performs a search of its corpus or corpora. The applications then return the results that they found for the characters, generally in parallel with each other. As the responses arrive at the local search application from the various third-party applications, the local search application combines the received results with the results from the main data sources that it identified itself (box 512). At this stage, not enough characters have been entered for the local search application to forward the query information to remote search systems.

At box 514, however, additional characters are typed or spoken by a user, and the local search application again checks the main data sources and sends the new characters to the registered applications. The local search application also sends the characters to the search engine, and the third-party applications (box 520) and search engine (box 518) process the queries and return search results to the local search application. At box 522, the local search application receives the responses and combines them with the main data sources, including by ranking them such as in the manners discussed above. Finally, at box 524, the process displays all of the integrated results to the user of the device (box 524).

Figure 6:
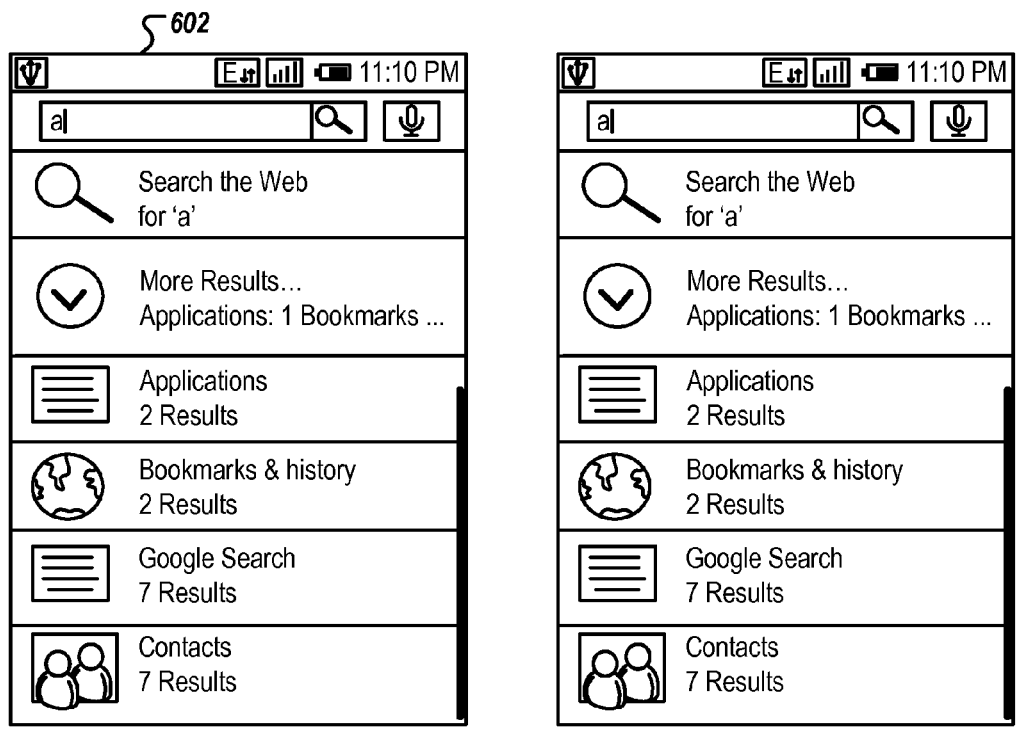
FIG. 6 shows screen shots from a mobile computing device delivering search results for multiple corpora.

FIG. 6 shows screen shots from a mobile computing device delivering search results for multiple corpora. The left screen shot generally shows a result set from entering the letter "a" in a search box for a mobile device, such as a device running the Android operating system. The first result in the list offers the user a chance simply to submit the letter "a" as a final and complete search query. The second result shows that the user has one bookmark that starts with the letter "a". The third result shows two applications on the device start with the letter "a," and the fourth shows two additional bookmarks in this regard. Finally, there are seven GOOGLE search results and seven contacts for the user that begin with the letter.

The right screen shows what may be shown if a "more" selection is provided on the first screen and a user selects that control. The "more" selection may expose results from corpora or applications that are not, at the moment, considered to be primary, though a user's selection of one of the results on the second screen may cause the related corpus to be moved up in relevance so that it appears on the first result screen. In this example, the user has installed a certain application from AMAZON.COM, and also includes a particular contact whose name starts with "a," among other things. Thus, in short, the integrated search results may span across multiple distinct pages, and certain corpuses of information may be elevated or lowered across the dividing line between the pages, depending on whether a user has selected content from those corpuses in the recent history of the user's interaction with their device.

Figure 7:
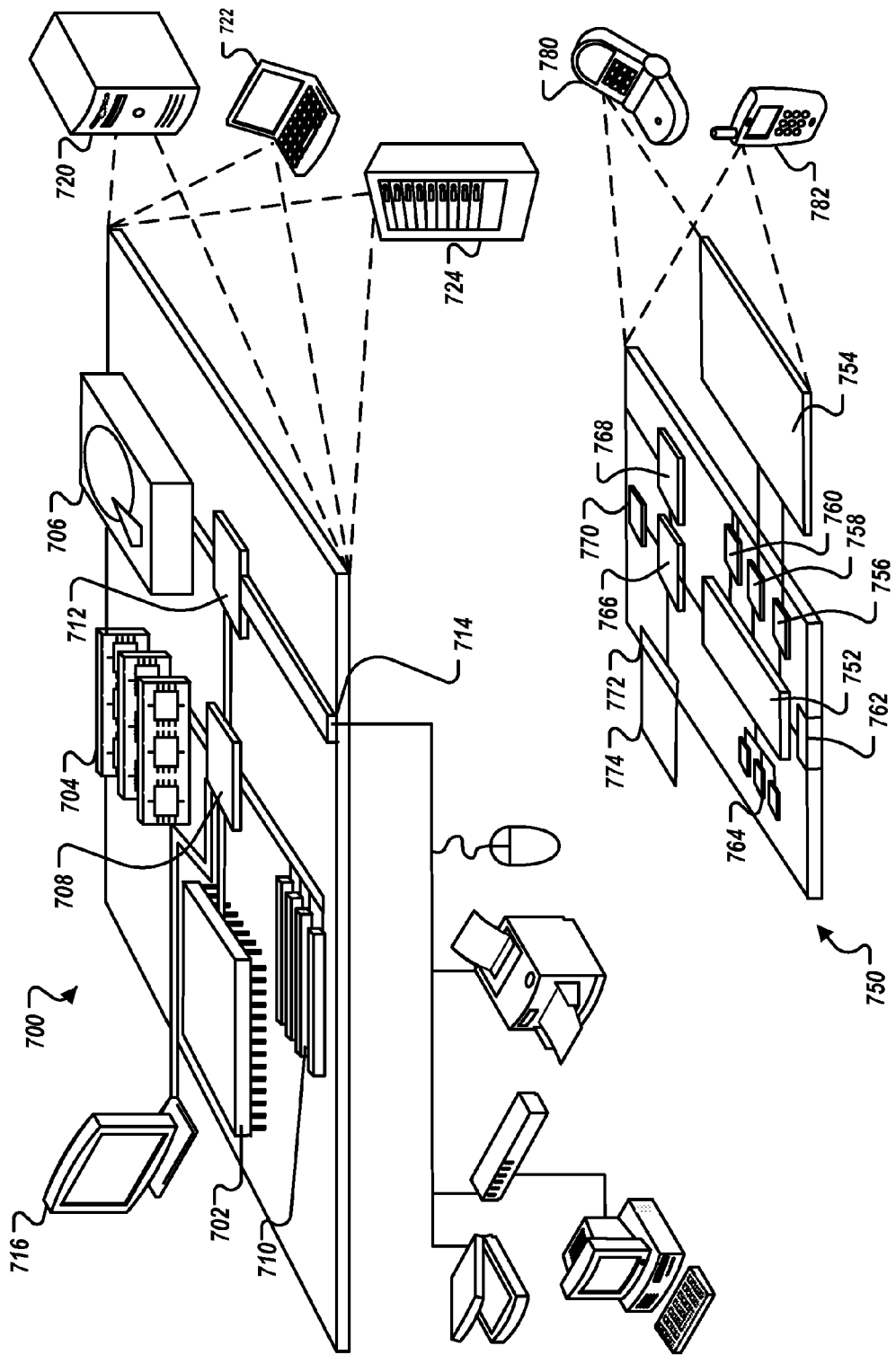
FIG. 7 shows an example of a generic computer device 700 and a generic mobile computer device 750, which may be used with the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Device 750 may also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 750 and used to update the display of the respective devices 750 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed:

1. A computer-implemented search method, comprising:
    receiving, by a search application installed on a user device, a query entered by a user of the user device;
    providing, by the search application, the query to a plurality of third-party applications installed on the user device, other than the search application;
    receiving, by the search application, a respective set of search results from each of the third-party applications as a respective response to the query, wherein each respective set of search results identifies data managed by the respective third-party application from which the respective set of search results is received, wherein at least one of the respective sets of search results includes multiple search results;
    integrating, by the search application, the respective sets of search results from the third-party applications into an integrated result set that includes groups of search results, wherein each group of search results corresponds to a different third-party application among the plurality of third-party applications and includes only the respective set of search results received from the corresponding third-party application;
    identifying, for each respective third-party application among the plurality of third-party applications, a respective score that indicates a number of user selections of search results from the respective third-party application that have previously occurred on the user device;
    ranking the groups of search results in the integrated result set based on the respective scores for the third-party applications that correspond to the groups of search results; and
    presenting, by the search application, the integrated result set on the user device in an arrangement that corresponds to the ranking of the groups of search results in the integrated result set.

2. The method of claim 1, further comprising registering the third-party applications, wherein:
    registering the third-party applications comprises storing registration information for the registered third-party applications; and
    providing the query to the plurality of third-party applications comprises accessing the stored registration information to determine a manner in which to provide the query to each of the registered third-party applications.

3. The method of claim 1, wherein providing the query to the one or more third-party applications comprises providing an updated query automatically to the third-party applications for each character entered by the user of the user device.

4. The method of claim 3, further comprising providing the query to one or more search services that are remote from the user device.

5. The method of claim 4, further comprising suppressing the providing of the query to the one or more search services until the user has entered at least a predetermined amount of information in the query.

6. The method of claim 5, wherein the predetermined amount of information comprises a predetermined number of characters in the query.

7. The method of claim 1, wherein:
    the user device includes one or more operating system components; and
    the method comprises:
        providing, by the search application, the query to the one or more operating system components and to one or more remote search services remote from the user device; and
        integrating, by the search application, respective sets of search results received from the one or more operating system components and the one or more remote search services with the sets of search results from the third-party applications to form the integrated result set.

8. The method of claim 7, further comprising:
    initially ranking groups of search results that correspond to the one or more operating system components or the one or more remote search services higher than groups of search results that correspond to the third-party applications; and
    in response to receiving a selection from the user of a search result from a particular third-party application, ranking, in a subsequent search session, a group of search results that corresponds to the particular third-party application higher than groups of search results that correspond to the one or more operating system components or the one or more remote search services.

9. The method of claim 1, further comprising:
receiving a user selection in the search application of a search result from a particular application among the plurality of third-party applications; and
modifying, in response to receiving the user selection of the search result from the particular application, the respective score for the particular application so as to increase a likelihood that a group of search results corresponding to the particular application will be ranked higher by the search application in an integrated result set for a subsequent search session.

10. The method of claim 1, wherein:
the respective sets of search results received by the search application from one or more of the third-party applications include relevance scores for the search results that indicate a relevance of the search results to the query, the relevance scores having been determined by the respective third-party applications that provided the relevance scores to the search application, and
the groups of search results in the integrated result set are ranked further based on the relevance scores.

11. One or more non-transitory computer storage devices having instructions stored thereon that, when executed by a computer, cause the computer to perform operations comprising:
receiving, by a search application installed on a user device, a query entered by a user of the user device;
providing, by the search application, the query to a plurality of third-party applications installed on the user device, other than the search application;
receiving, by the search application, a respective set of search results from each of the third-party applications as a respective response to the query, wherein each respective set of search results identifies data managed by the respective third-party application from which the respective set of search results is received, wherein at least one of the respective sets of search results includes multiple search results;
integrating, by the search application, the respective sets of search results from the third-party applications into an integrated result set that includes groups of search results, wherein each group of search results corresponds to a different third-party application among the plurality of third-party applications and includes only the respective set of search results received from the corresponding third-party application;
identifying, for each respective third-party application among the plurality of third-party applications, a respective score that indicates a number of user selections of search results from the respective third-party application that have previously occurred on the user device;
ranking the groups of search results in the integrated result set based on the respective scores for the third-party applications that correspond to the groups of search results; and
presenting, by the search application, the integrated result set on the user device in an arrangement that corresponds to the ranking of the groups of search results in the integrated result set.

12. The one or more non-transitory computer storage devices of claim 11, wherein the operations further comprise registering the third-party applications, wherein:
registering the third-party applications comprises storing registration information for the registered third-party applications; and
providing the query to the plurality of third-party applications comprises accessing the stored registration information to determine a manner in which to provide the query to each of the registered third-party applications.

13. The one or more non-transitory computer storage devices of claim 11, wherein providing the query to the one or more third-party applications comprises providing an updated query automatically to the third-party applications for each character entered by the user of the user device.

14. The one or more non-transitory computer storage devices of claim 13, wherein the operations further comprise providing the query to one or more remote search services.

15. The one or more non-transitory computer storage devices of claim 14, wherein the operations further comprise suppressing the providing of the query to the one or more remote search services until the user has entered at least a predetermined amount of information in the query.

16. The one or more non-transitory computer storage devices of claim 15, wherein the predetermined amount of information comprises a predetermined number of characters in the query.

17. The one or more non-transitory computer storage devices of claim 11, wherein:
the user device includes one or more operating system components;
the operations comprise:
providing, by the search application, the query to the one or more operating system components and to one or more remote search services remote from the user device; and
integrating, by the search application, respective sets of search results received from the one or more operating system components and the one or more remote search services with the sets of search results from the third-party applications to form the integrated result set.

18. The one or more non-transitory computer storage devices of claim 17, wherein the operations further comprise:
initially ranking groups of search results that correspond to the one or more operating system components or the one or more remote search services higher than groups of search results that correspond to the third-party applications; and
in response to receiving a selection from the user of a search result from a particular third-party application, ranking, in a subsequent search session, a group of search results that corresponds to the particular third-party application higher than groups of search results that correspond to the one or more operating system components or the one or more remote search services.

19. The one or more non-transitory computer storage devices of claim 11, wherein the operations further comprise:
receiving a user selection in the search application of a search result from a particular application among the plurality of third-party applications; and
modifying, in response to receiving the user selection of the search result from the particular application, the respective score for the particular application so as to increase a likelihood that a group of search results corresponding to the particular application will be ranked higher by the search application in an integrated result set for a subsequent search session.

20. The method of claim 1, wherein the number of user selections of search results indicated by the respective score for a first of the third-party applications counts user selections of search results from the first of the third-party applications that are different from search results in the respective set of search results received from the first of the third-party applications as a response to the query.

21. The method of claim 1, wherein the respective score for a first third-party application among the plurality of third-party applications indicates a collective number of user selections of multiple different search results from the first application that have previously occurred on the user device.

22. The method of claim 1, wherein:
the query entered by the user of the user device is a first query, and
the respective score for a first third-party application among the plurality of third-party applications indicates a number of user selections of search results returned by the first third-party application in response to one or more queries, including a second query that is different from the first query, that have previously occurred on the user device.

23. A computing device comprising:
one or more processors; and
one or more non-transitory computer-readable media having instructions stored thereon that, when executed by the one or more processors, cause performance of operations comprising:
receiving, by a search application installed on the computing device, a query entered by a user of the computing device;
providing, by the search application, the query to a plurality of third-party applications installed on the computing device, other than the search application;
receiving, by the search application, a respective set of search results from each of the third-party applications as a respective response to the query, wherein each respective set of search results identifies data managed by the respective third-party application from which the respective set of search results is received, wherein at least one of the respective sets of search results includes multiple search results;
integrating, by the search application, the respective sets of search results from the third-party applications into an integrated result set that includes groups of search results, wherein each group of search results corresponds to a different third-party application among the plurality of third-party applications and includes only the respective set of search results received from the corresponding third-party application;
identifying, for each respective third-party application among the plurality of third-party applications, a respective score that indicates a number of user selections of search results from the respective third-party application that have previously occurred on the computing device;
ranking the groups of search results in the integrated result set based on the respective scores for the third-party applications that correspond to the groups of search results; and
presenting, by the search application, the integrated result set on the computing device in an arrangement that corresponds to the ranking of the groups of search results in the integrated result set.

* * * * *